April 25, 1967

D. A. LIPPS 3,316,063

PROCESS FOR HEAT-TREATING LIQUID SULFUR CONTAINING
CARBONACEOUS IMPURITIES

Filed Dec. 19, 1963

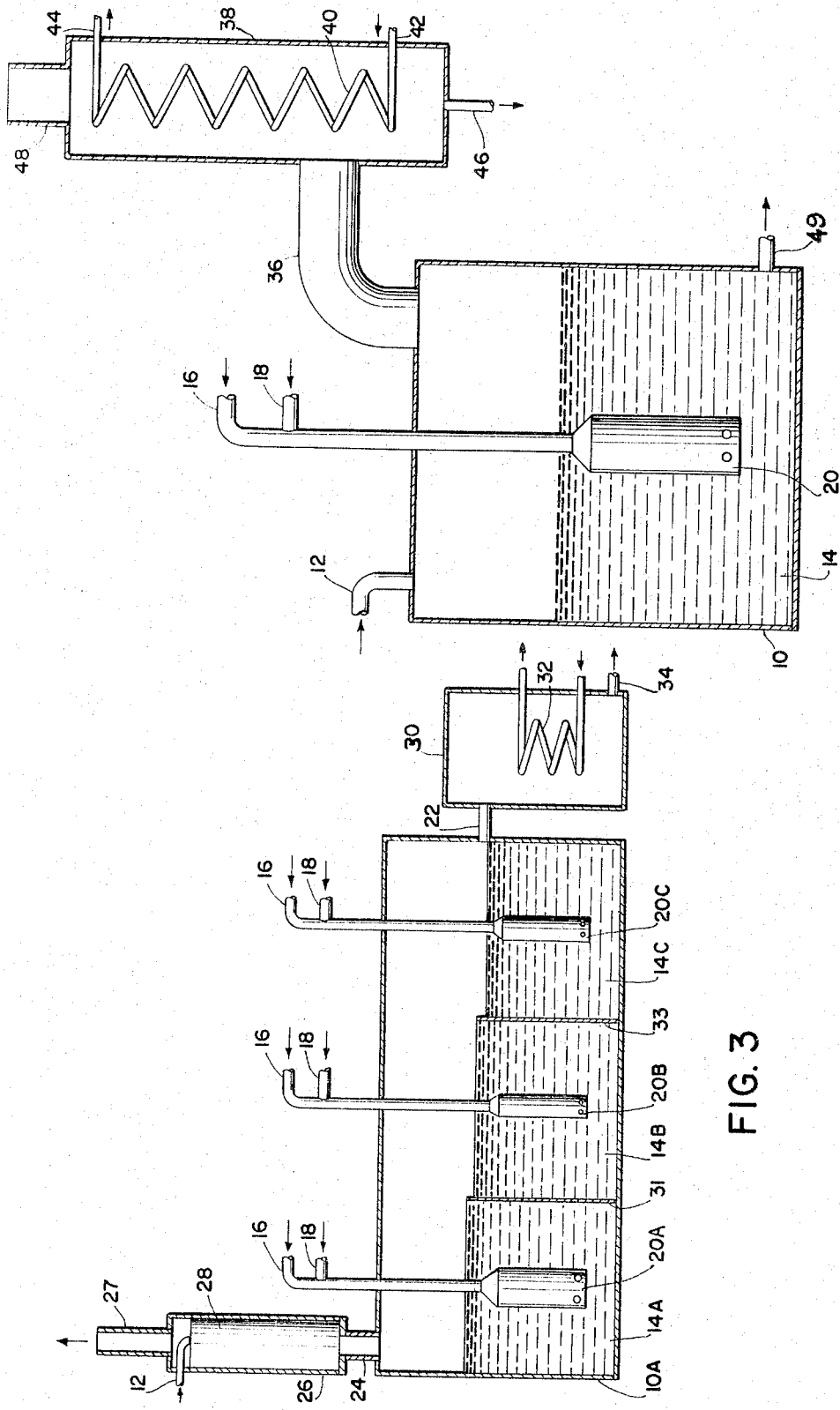

3,316,063
PROCESS FOR HEAT-TREATING LIQUID SULFUR CONTAINING CARBONACEOUS IMPURITIES
Delbert A. Lipps, New Orleans, La., assignor to Freeport Sulfur Company, New York, N.Y., a corporation of Delaware
Filed Dec. 19, 1963, Ser. No. 331,733
11 Claims. (Cl. 23—224)

This invention relates to a process and apparatus for purifying sulfur. More particularly it relates to a process and apparatus for heat treating sulfur to convert dissolved carbonaceous impurities to insoluble carbon-sulfur compounds, hydrogen sulfide, and carbon disulfide.

Sulfur, as used in the trade, is an exceptionally pure material compared with most other common materials. The crude sulfur of commerce is normally required to contain less than 0.5% total impurities.

The most prevalent and troublesome contaminant of sulfur mined by the Frasch process is dissolved carbonaceous matter. It may occur in concentrations as high as 2%, but as little as 0.05% can degrade the normally bright yellow color to a dirty gray; will cause heat-transfer surfaces in molten sulfur tanks to gradually become coated with a carbonaceous scale that interferes with heat transfer; and makes burning of the sulfur difficult by plugging burner nozzles, or covering burning-sulfur surfaces, with a carbonaceous scale. For these reasons, high carbonaceous content reduces the marketability of sulfur, and users frequently demand that sulfur supplied to them be low in carbonaceous content.

Frasch process sulfur producers have attempted to reduce the dissolved carbonaceous matter in their product in a variety of ways, for a number of years.

One of the cheapest and simplest methods that has been used is to spray the liquid sulfur into the air, allowing it to fall in heated collection tanks. This aeration allows some of the more volatile portions of the carbonaceous matter to evaporate into the air. However, it is seldom possible to reduce the carbonaceous content by this method by more than 10%.

A more elaborate variation of this principle that was been used is to flow the liquid sulfur downward over packing in a tower while air is blown upward through it. Only the more volatile portion of the carbonaceous matter is removable by this procedure, and the carbonaceous content is generally reduced by about 15%.

Filtration of the liquid sulfur after agitation with acid, lime, or activated clays has been widely used. This process generally succeeds in reducing the carbonaceous content by about 50%; and it specifically removes most of the coloring portions of the carbonaceous matter, leaving the sulfur bright and clean in appearances, even though it still contains considerable carbonaceous contamination.

Extraction, by contact of the liquified sulfur with a solvent for the carbonaceous matter, e.g., benzene, is another method of purification that has been described (U.S. Patent No. 3,042,503). This method is useful for reducing the carbonaceous matter content from very high initial values, in the range of 1% to 2%, but it is not capable of bringing the content much below 0.2%. Furthermore, the necessary equipment is quite expensive, must be carefully controlled, and involves the hazard of handling a hot, volatile, generally flammable, solvent.

Sublimation, to produce flowers of sulfur, has long been a standard method of purification. This method is quite costly, and the product still contains enough carbonaceous matter to cause it to turn black on boiling.

In 1939, U.S. Patent No. 2,169,261, was granted C. O. Lee on a method and apparatus for distilling sulfur. This process produces a product with no more than 0.01% carbonaceous matter, but the product contains hydrogen sulfide that can be removed only by additional processing. Also, the necessity of blowing down the undistilled residue before the carbon concentration exceeds about 2%, to avoid resulting high viscosity, makes the sulfur loss high if the feed sulfur contains much carbon. The process requires an expensive installation of boilers constructed of specially-chosen corrosion-resistant metals; and corrosion of the boiler parts, regardless of care in choosing special metals, is inevitable, so that periodic replacement of parts is a necessary cost of the operation. In addition, the heat transfer surfaces of the boiler accumulate a scale of carbonaceous material that seriously reduces heat transfer, and results in excessive heating, and corrosion rates, of the heat transfer surfaces.

It has long been known that heating sulfur contaminated with dissolved carbonaceous matter near its boiling point of 832° F. and retaining it at this temperature for 15 to 30 minutes causes some of the sulfur to react with the carbonaceous matter to form hydrogen sulfide, carbon disulfide, and an insoluble carbon-sulfur compound. This reaction was utilized in the aforementioned Lee distillation patent, and was utilized to greater advantage in a process on which Patent No. 2,941,686 was issued in 1960, to V. H. Brogdon et al.

The conversion by heat treatment, of the single-phase system containing sulfur and dissolved, carbonaceous matter, to a three-phase system-containing, sulfur, hydrogen sulfide, carbon disulfide, and insoluble carbonaceous matter, obviously increases the number of possible methods by which a pure sulfur product can be recovered. The Lee patent, supra, distilled the sulfur; the Brogdon et al. patent, supra, distilled the sulfur, but also pointed out that filtration could be used. Settling or centrifugation is also successful if the insoluble carbonaceous matter precipitates in large enough particles.

Of these methods of separating the insoluble carbonaceous matter from the sulfur, only distillation has, in the past, proved to be really practicable. In practice, the insoluble carbonaceous matter precipitates in such a finely-divided state that it will not settle out; centrifuging of a commercially practical nature, is ineffective in causing separation; and filtration is excessively expansive because of rapid blinding of the filter medium.

In 1942, R. F. Bacon and R. Fanelli published (Ind. Eng. Chem., 34, pp. 1043–1048) a description of a method of purifying sulfur utilizing the heat-treatment reaction, magnesia being added to scavenge hydrogen sulfide and any acid formed, and to act as a filter aid. They repeated this heat treatment, with magnesia added, about four times, following each heat treatment with a filtration. Their product was of exceedingly high purity, but amounted to only about 20% of the sulfur with which they started, the rest being lost. The process was proposed only for laboratory purposes; and obviously would not be suitable for commercial use in view of the high sulfur loss, the high cost of magnesia in the quantities used, and the probable low filtration rate.

An object of this invention is to provide a commercially practicable method and apparatus for heat treating sulfur contaminated with dissolved carbonaceous matter, that is relatively low in equipment cost, low in operating and maintanance cost, and which has small sulfur losses.

Another object of this invention is to provide a method and apparatus for heat treating sulfur containing carbonaceous material in such a way that most of the carbon-sulfur compound may be removed by filtration with reduced filter blinding and at high filtration rates.

Another object of this invention is to provide a method and apparatus for heat treating sulfur containing carbonaceous material so that the sulfur may be distilled with reduced scaling of heat transfer surfaces.

Another object is to provide a method and apparatus for heat treating and distilling sulfur that avoids transfer of heat through metal surfaces with consequent scaling and corrosion of those surfaces.

Other objects will be apparent to those skilled in the art from reading the present description, taken in conjunction with the appended drawings, in which:

FIGURE 3 is a schematic view of an embodiment utilizing multiple submerged burners in the practice of this invention;

FIGURE 4 is a schematic view of an embodiment of this invention used for the distillation of sulfur.

It has been found that heat treatment of sulfur, consisting of holding it at a temperature near its boiling point of 832° F. for a period of at least about a minute, preferably up to about 15 minutes or even an hour or more, causes the dissolved carbonaceous content to decrease because, under these conditions, the carbonaceous matter reacts with some of the sulfur to form hydrogen sulfide, carbon disulfide, and an insoluble carbon-sulfur compound. The total carbon content is not greatly reduced, but it is present, after heat treatment, in an insoluble rather than a dissolved form. The insoluble carbon-sulfur compound is more easily removable, to make a pure sulfur product, than is the dissolved carbonaceous matter. But, for some purposes, mere conversion of the carbonaceous matter to the insolube form, without subsequent removal, is all that is necessary, since sulfur containing only the insoluble carbon-sulfur compound, although its color is not bright yellow, does not scale heat transfer surfaces as rapidly as that containing dissolved carbonaceous matter.

The objects of this invention may be achieved by heating molten sulfur containing up to about 2% by weight of soluble carbonaceous matter, out of contact with the air, in a container, having a restricted opening to the atmosphere, with a submerged burner for short periods, such as about a minute up to about an hour or so, and preferably up to about 15 minutes, at elevated temperatures from about 600 to 832° F. The major portion of the sulfur treated is recovered as a product which is low in dissolved carbonaceous content, and low in hydrogen sulfide and carbon disulfide.

It is a feature of this invention that after heat treatment the sulfur containing carbonaceous material does not tend to scale the heat transfer equipment as does the untreated sulfur, and so may be more conveniently and economically purified by distillation.

It is another feature of this invention that the normally soluble carbonaceous matter contaminating the sulfur is converted by heat treatment into an insoluble carbon-sulfur compound which has reduced tendency to scale heat transfer surfaces and which has a reduced tendency for filter blinding, partly because the particles formed are of relatively large size.

If a more highly purified product is desired the present invention may be utilized to directly distill the sulfur containing carbonaceous matter and recover a highly pure, bright-yellow sulfur product. It is a further feature of this invention that the distillation product has a lower hydrogen sulfide content than distilled products produced by other methods. The remainder of the product is high in carbonaceous matter containing about up to 8% of carbon as insoluble carbonaceous matter. This sulfur may be discarded with a relatively small loss in sulfur, but preferably, the remaining carbonaceous matter may be filtered out and substantially all of the sulfur originally fed to the treating apparatus may be recovered.

Figures 1, 2:
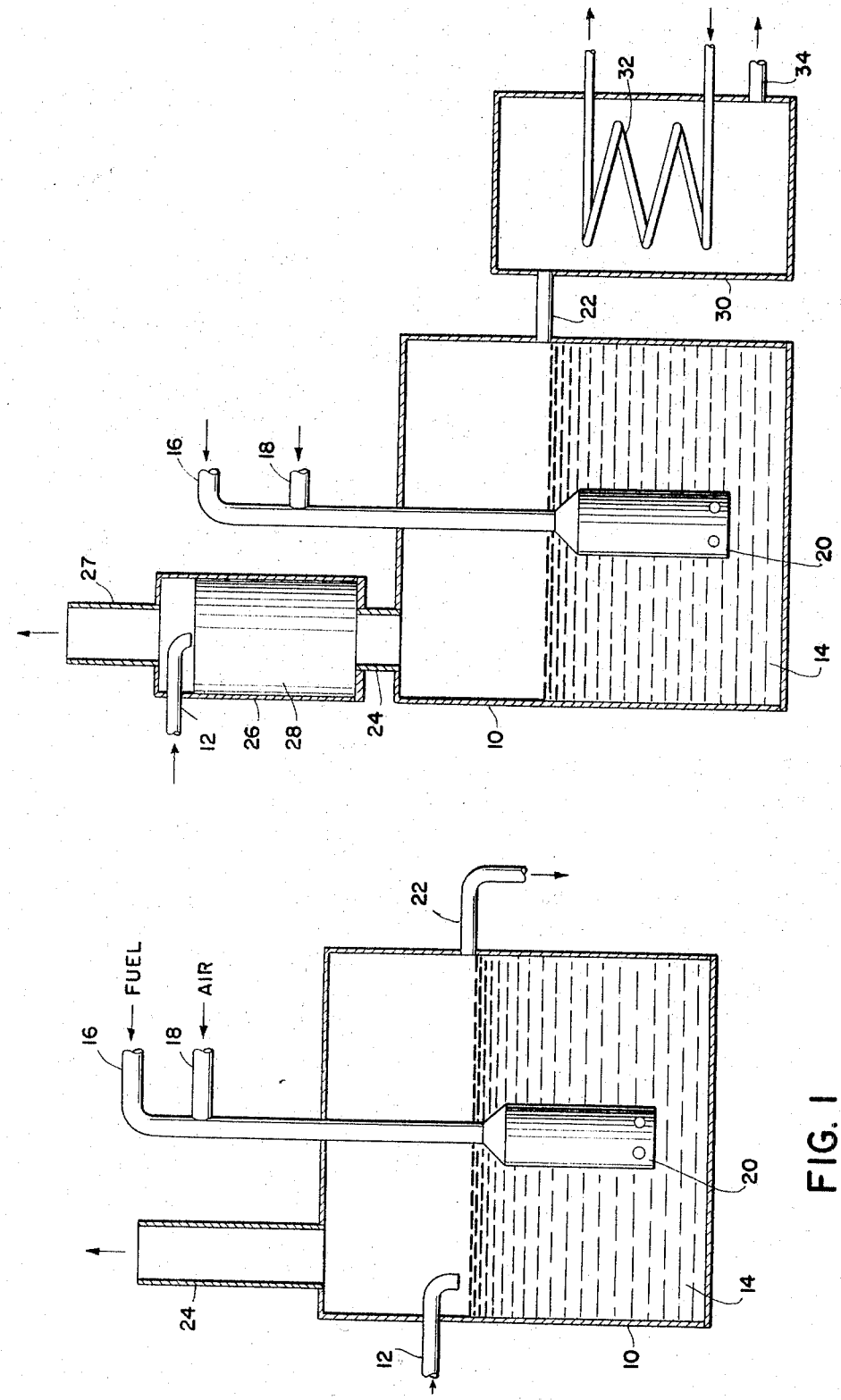
FIGURE 1 is a schematic view of one embodiment of the apparatus and method of this invention.
FIGURE 2 is a schematic view of another embodiment of the method and apparatus useful in practicing the present invention.

As shown in FIGURE 1, sulfur containing dissolved carbonaceous impurities enters tank 10 through inlet 12. Tank 10 is a closed vessel, having only a restricted outlet 24 to the atmosphere, and is partially filled with molten sulfur 14. Fuel and air are introduced through conduits 16 and 18, respectively. Submerged burner 20, burning a mixture of fuel and air, agitates and heats, to a temperature in the range of 600° F. to 700° F., the sulfur 14, in which it is submerged.

The term "submerged burner," as used herein, and as widely used in commerce, refers to a burner so designed that the hot gaseous products of combustion are discharged beneath the surface of the liquid sulfur. The burner flame itself may be located either above or below the liquid surface, but, if located above, the flame must be enclosed so as to force the hot combustion products to pass beneath the liquid surface. A number of submerged burners are available commercially, and in most of these the flame is located above the surface of the liquid, but is enclosed within a tube which extends some distance below that surface.

A mixture of fuel and air is burned in the burners. The fuel may be any of the well-known gaseous or liquid fuels, natural gas being a preferred fuel. The proportion of air-to-fuel fed to the burners is desirably such that neither excess air nor excess fuel remains after combustion. Under these conditions the combustion products consist substantially of carbon dioxide, steam, nitrogen, substantially no sulfur dioxide being produced.

After being treated by this action for a period of time determined by the capacity of tank 10 and the rate at which sulfur enters through inlet 12, the treated sulfur leaves tank 10 through outlet 22 at a rate substantially equal to that at which it enters through inlet 12. Tank 10 must be covered to exclude entrance of atmospheric air, providing only a restricted vent 24 for discharge of combustion gases. Entrance of atmospheric air into the tank will spontaneously ignite the sulfur at the temperatures that are effective for heat treatment.

While in the tank, the dissolved carbonaceous impurities are converted partially to an insoluble carbon-sulfur compound, partially to hydrogen sulfide and partially to carbon disulfide, as a result of the elevated temperature, produced and maintained by the submerged burner. The heat produced by the burner is transferred to the liquid sulfur in which it is submerged by the hot combustion gases produced. These gases, upon leaving the burner, rise through the liquid as bubbles, causing violent agitation of the sulfur, and transferring their heat by conduction, convection and radiation, directly from bubbles to sulfur without the intervention of any solid heat transfer surface. The bubbles rising through the liquid also collect and remove hydrogen sulfide and carbon disulfide from the liquid, as rapidly as it is produced by the reaction.

It will be understood that, since heat is transferred directly from gas bubbles to the liquid, there will be no heating surfaces to corrode, or for the precipitating carbon-sulfur compound to scale. The direct method of heat transfer, together with the violent agitation of the liquid, inherent in the process, results in exceptionally efficient utilization of the heat, and makes mechanical agitating devices entirely unnecessary. Furthermore, the agitating and sweeping action of the gases remove hydrogen sulfide and carbon disulfide formed more rapidly and completely than by any other method presently available. It has also been found, quite unexpectedly, that the carbon-sulfur compound formed in this process precipitates in unusually large particles that do not blind filters. The product of the process can therefore be filtered for removal of the precipitated carbon-sulfur compound—an operation that has not heretofore been practicable because of blinding of the filter by the precipitate.

As stated previously, the heat treating reaction proceeds, at practicable rates, at temperatures above 600° F.

The reaction rate increases with temperature, becoming, at 700° F., about double that at 600° F. An upper temperature limit of operation is encountered, however, at 832° F.—the boiling point of sulfur at atmospheric pressure—unless the system is operated under pressure. The use of a submerged burner imposes a still lower upper limit of temperature of operation. This is because the passage of the combustion gases through the liquid causes evaporation of the sulfur below its boiling point.

In the simple apparatus of FIGURE 1, operation at atmospheric pressure and a temperature of about 760° F., would result in vaporization of the entire sulfur feed, so that there would be not heat treated liquid product. Even at a temperature as low as 600° F. (the minimum practicable for effective heat treatment), about 7% of the sulfur feed is removed as vapor, unless collected by apparatus such as shown in FIGURE 2.

FIGURE 2 illustrates another embodiment of this invention especially designed to make commercially practicable the recover of sulfur vapor contained in the combustion gases leaving the tank. This apparatus is similar to that in FIGURE 1, except that tower 26 containing packing 28 is mounted over vent 24 in the top of tank 10, forcing the combustion gases to pass upward through tower 26 before release to the atmosphere through vent 27. In this embodiment, the feed sulfur enters through inlet 12 at the top of packed tower 26, so that the relatively cool, preferably about 280° F., entering sulfur flows downward, over packing 28, before entering tank 10. In this way, the exhaust gases contact, counter-currently, the relative cool incoming sulfur. The exhaust gases are thereby cooled and their contained sulfur vapor is condensed. The exhaust gases vented to the atmosphere from the top of the tower will thus be cooled to about the temperature of the entering sulfur and will be substantially free of sulfur vapor. The sulfur condensed from the vapor mixes with the feed sulfur in the tower, and is finally returned to tank 10 with the entering feed sulfur. This embodiment reduces sulfur vapor losses to nearly the vanishing point, and, preheats the feed sulfur with resulting heat conservation.

Packing 28 may be comprised of any of the conventional tower packings that are resistant to sulfur, such as Raschig ring, berl saddles, etc., made of ceramics, stainless steel, etc. With a tower of adequate size, it is possible to heat the liquid sulfur to a temperature of 760° F., or higher, without incurring any appreciable loss as vapor. The apparatus of FIGURE 2 therefore permits commercially practicable heat treating of sulfur in the temperature range of 600° F. to 750° F. Preferably the heat treating is carried out in the range of 700° F. to 750° F.

As shown in FIGURE 2, a product cooling tank 30 is desirably used in conjunction with the apparatus previously described. The hot product, leaving the treating tank 10 through outlet 22, enters tank 30, which contains cooling coil 32 through which a cooling medium, such as water, flows. The product, thus being cooled to any desired temperature above the freezing point of sulfur, is finally discharged through outlet 34.

Cooling of the sulfur below about 475° F. is necessary before exposing the product to air because sulfur ignites spontaneously at higher temperatures. For purposes in which the hot (600° F.–750° F.) sulfur is useable without prior exposure to the air, e.g., in a sulfur burner, cooling tank 30 may be omitted.

FIGURE 3 illustrates another embodiment of the present invention in which one tank 10A is divided into three sections by partitions 31, 33 which are used in series. In FIGURE 3 the feed sulfur enters through conduit 12 into tower 26 containing packing 28 and flows downward, being heated by the exiting combustion gases, and cooling the combustion gases and extracting sulfur vapors therefrom. The heated sulfur enters tanks 10A and enters sulfur mass 14A. Submerged burner 20A heats the sulfur to the desired temperature, and the combustion products agitate the sulfur. The sulfur overflows partition 31 into sulfur mass 14B at about the rate at which the make-up sulfur enters mass 14A. Submerged heater 20B maintains the temperature of sulfur mass 14B and the hot combustion products further agitate and heat treat the sulfur. The secondarily treated sulfur overflows partition 33 at about the same rate that the sulfur overflows partition 31 and enters into sulfur mass 14C which is heated and agitated by submerged burner 20C. The heat treated sulfur leaves tank 10A through outlet 22 and enters tank 30 which contains cooling coil 32 through which a cooling medium, such as water, flows. The product after being cooled is discharged through outlet 34.

If desired, individual tanks may be utilized; only two tanks, or many more, may be used, if desired. The greater the number of tanks in series, the smaller need be the combined capacity of all of them, and the shorter the time necessary for any increment of sulfur to be subjected to the action of the system. The reason for this is that the intense agitation occurring in each tank causes rapid mixing—with the consequences that some increments of sulfur leave the tank very shortly after entering, and do not undergo appreciable heat treatment. Multiple tanks in series reduce the possibility of this occurring.

For example, a system for reducing 10 tons of sulfur per hour from 0.5% dissolved carbonaceous matter to 0.01% dissolved carbonaceous matter may require a single tank with a capacity of 53 tons of sulfur. The same result can be accomplished using two tanks with a combined capacity of 13 tons of sulfur; or by using three tanks with a combined capacity of 9 tons of sulfur. With an infinite number of tanks, it can be calculated that, to obtain the desired result, 4¼ tons of combined sulfur capacity would still be required. While two tanks result in much smaller equipment than one, and three permit still smaller equipment, increasing the number beyond a certain point accomplishes little further toward reduction in size, but, nevertheless increases cost and complexity. In general, therefore, two to four stages are desirable and economical.

In multiple stage systems, only the first stage need have a submerged burner large enough to heat the sulfur to the operating temperature. The submerged burners used in all succeeding stages may be much smaller since they are necessary only for compensating heat losses, not for increasing the temperature.

A preferred embodiment of the invention is shown in FIGURE 4 which illustrates how the present invention may be utilized to produce distilled sulfur directly, without the intervention of a sulfur boiler of the type previously utilized for sulfur distillation. In this embodiment the submerged burner is operated to vaporize the sulfur in tank 10. The mixture of combustion products and sulfur vapor pass from tank 10 through pipe 36 into condenser 38 containing cooling coil 40. The cooling medium, such as water, enters coil 40 through inlet 42 and discharges through outlet 44. In condenser 38 the sulfur is condensed to a liquid, cooled to a desirable temperature, and then discharged from the condenser through conduit 46. The non-condensable combustion products are discharged from the condenser through conduit 48.

The sulfur in the tank is concentrated by the evaporation until its carbon content reaches as high as about 8%, or any lower concentration desired, and is discharged continuously through outlet 49 at this carbon concentration. This 8% allowable carbon concentration in the undistilled residue is higher than that for any distillation method heretofore developed. As mentioned previously, 2% of carbon as carbonaceous material is about the highest allowable in the usual sulfur boiler. Thus, it is possible by this method, to distill a greater proportion of the feed sulfur, and discharge, as undistilled residue, a much smaller proportion.

There are thus two products of the operation. (a) The major portion of the sulfur feed to the unit is recovered as a highly purified distillate, and (b) a very small part of the sulfur feed to the unit is discharged as blowdown with a high concentration of carbon. The blowdown may be discarded at small cost because it represents loss of only a very small fraction of the sulfur. But, if its recovery is desired, it may be processed further, as by filtration, to remove the carbon. Filtration is facilitated by the large particle size of the carbon-sulfur compounds produced.

Figure 5:
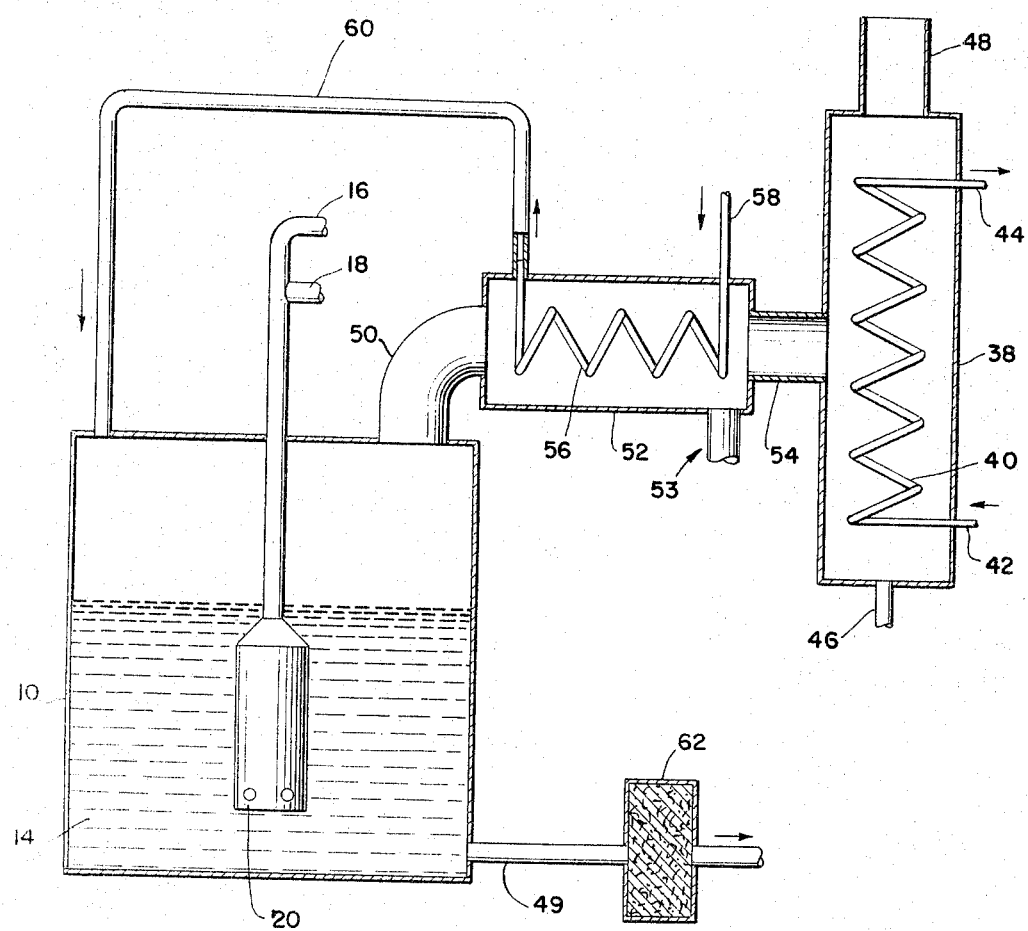
FIGURE 5 is a schematic view of another embodiment of this invention.

FIGURE 5 illustrates another embodiment of the present invention. In this embodiment the mixture of combustion products and sulfur vapor leaves tank 10 through conduit 50, passes through sulfur preheater 52 and conduit 54 into condenser 38. Preheater 52 contains coil 56. Liquid sulfur at about 280° F. enters coil 56 through conduit 58, is heated while cooling the surrounding sulfur vapor, leaves coil 56 through conduit 60 and enters tank 10. Condensed sulfur is removed through conduit 53. Preheater 52 conserves some of the heat in the vapor and combustion products by utilizing the products to preheat the feed to the unit. The quantity of heat in the vapor and the combustion products is greater than that necessary to preheat the liquid feed, so that it is still necessary to include cooling coil 40 in condenser 38, but a smaller cooler condenser is required when operated in conjunction with a sulfur-cooled condenser. The purity of the undistilled residue may be increased by passing this residue, sulfur containing increased concentrations of insoluble carbon-sulfur compounds, through filter 62 which removes substantially all of such carbon-sulfur compounds.

The invention may be utilized in a variety of ways to obtain a useful product. For example, the cooled, heat-treated product produced by the embodiments of FIGURES 1, 2 and 3 may be used directly for many purposes. This product is very dark, or black, and does not give the impression of being very pure. However, it has the advantage that it does not rapidly deposit a carbonaceous scale on heated surfaces, as the untreated feed would; and it may be handled by most sulfur burners with less trouble and lower maintenance than may the untreated sulfur. In general, the product may be used for any purpose in which the yellow color of pure sulfur is not required, and for these purposes does not have the objectionable characteristics of sulfur contaminated with hydrocarbons.

A second example of utilizing the invention is to feed the hot, heat treated product of the embodiment of FIGURES 1, 2 and 3 to a standard sulfur boiler for distillation. In this case, the invention improves the operation of the standard sulfur boiler in several ways. The process and apparatus of the invention increase the distillation capacity of the boiler by relieving the boiler of the heat-load of preheating feed, and the product of the invention allows greater heat input to the boiler because scaling of the boiler tubes is reduced by the heat treated sulfur.

A third example of utilizing the invention is to filter the cooled, heat treated liquid sulfur product of the embodiments of FIGURES 1, 2 and 3 with or without admixture of filter aid, to produce a product of low carbon content. The method of heat treating described, as distinguished from other heat treating methods, causes the formation of large sized carbon-sulfur compounds which have reduced tendency to plug a filter.

A fourth method of utilizing the invention is to distill the sulfur directly, in accordance with the embodiment of FIGURES 4 and 5. The product from condensation of the vapor is a high quality, substantially carbon-free sulfur. The blowdown from the operation is such a small fraction of the whole that it may be discarded without serious sulfur loss, but is, nevertheless, entirely suitable for filtration for recovery of most of the sulfur contained as a low-carbon product.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

*Example 1*

A batch of sulfur containing dissolved carbonaceous matter equivalent to 0.25% carbon by weight was heat treated by the submerged burner technique, such as that shown in FIGURE 1, at a temperature of 693° F. for a period of 3 to 5 minutes. It was then cooled to a normal liquid-handling temperature (about 300° F.) and filtered. Filtration proceeded at an average rate of 0.029 tons/hr. per sq. ft. of filter surface—about twice the rate usually attained with similar sulfur treated by other methods. The filtered product contained only 0.02% carbon.

*Example 2*

Sulfur containing dissolved carbonaceous matter equivalent to 0.58% carbon by weight was fed continuously to a chamber containing a submerged burner, such as shown in FIGURE 5. The system was operated at atmospheric pressure and a temperature of 704° F. The distilled sulfur vapor contained in the combustion product gases was condensed as product which was bright yellow in color and contained 0.01% carbon. The product contained only one-tenth as much hydrogen sulfide as the equivalent product from a sulfur boiler of usual design. The carbonaceous matter was allowed to concentrate in the chamber to a level of carbon content of 5.6% and was maintained at this concentration by drawing off liquid sulfur residue at the necessary rate.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. For instance, while cooling and preheating equipment has been described as coils used in tanks, other types of heat transfer equipment may be substituted therefore.

What is claimed is:

1. A process for treating liquid sulfur containing soluble carbonaceous matter comprising heating liquid sulfur by direct contact with hot, gaseous combustion products to raise the temperature of the liquid sulfur to about 600 to 832° F., whereby the soluble carbonaceous matter is converted into insoluble carbon-sulfur compounds, hydrogen sulfide and carbon disulfide, said combustion products consisting essentially of carbon dioxide, steam and nitrogen.

2. A process for treating soluble-carbonaceous-material-containing sulfur comprising discharging hot gaseous combustion products below the surface of liquid sulfur to heat the liquid sulfur to a temperature of about 600–832° F. whereby the soluble carbonaceous matter is converted into insoluble carbon-sulfur compounds, hydrogen sulfide and carbon disulfide, said combustion products consisting essentially of carbon dioxide, steam and nitrogen.

3. A process as defined in claim 1 wherein the heating is carried out in a temperature range of between about 600 and 750° F.

4. A process according to claim 1 wherein the heating is carried out in a range between about 700 and 750° F.

5. A process for purifying liquid sulfur containing carbonaceous material comprising heat treating liquid sulfur by direct contact with hot gaseous combustion products to raise the liquid sulfur temperature to about 600–

832° F., whereby a portion of the sulfur is vaporized and is carried away with said gaseous combustion products, passing said sulfur-containing gaseous combustion products across a packing bed counter-currently to make-up liquid sulfur whereby the sulfur vapors are cooled to a liquid state and recovered, said combustion products consisting essentially of carbon dioxide, steam and nitrogen.

6. A process according to claim 5 comprising the further step of cooling the heat treated liquid sulfur.

7. A process according to claim 5 wherein the heat treatment of the sulfur by hot gaseous combustion products is carried out in at least two stages.

8. A process for the purification of liquid sulfur containing soluble carbonaceous material comprising heating the liquid sulfur by direct contact with hot gaseous combustion products to its boiling point, distilling the heat treated sulfur whereby a major portion of the sulfur is vaporized, and condensing the vaporized sulfur, said combustion products consisting essentially of carbon dioxide, steam and sulfur.

9. A process according to claim 8 wherein the carbon content of liquid sulfur remaining after vaporization of a portion of said liquid sulfur is concentrated up to about 8% by weight.

10. A process according to claim 8 wherein the carbon in the liquid sulfur is concentrated to between about 2 and 8% by weight.

11. A process according to claim 8 comprising the further step of heating the liquid sulfur feed by heat exchange with the vaporized sulfur and combustion gases prior to completely condensing said vaporized sulfur.

References Cited by the Examiner
UNITED STATES PATENTS

| | | | |
|---|---|---|---|
| 2,092,625 | 9/1937 | Rich | 23—229 |
| 2,169,261 | 8/1939 | Lee et al. | 23—224 |
| 2,834,655 | 5/1958 | Chute et al. | 23—277 |
| 2,941,868 | 6/1960 | Brogdon et al. | 23—224 |
| 3,212,553 | 10/1965 | Cathala | 158—4 |

OSCAR R. VERTIZ, *Primary Examiner.*

BENJAMIN HENKIN, *Examiner.*

H. S. MILLER, A. J. GRIEF, *Assistant Examiners.*

UNITED STATES PATENT OFFICE
CERTIFICATE OF CORRECTION

Patent No. 3,316,063                                     April 25, 1967

Delbert A. Lipps

It is hereby certified that error appears in the above numbered patent requiring correction and that the said Letters Patent should read as corrected below.

Column 1, line 41, for "was" read -- has --; line 52, for "appearances" read -- appearance --; column 2, line 23, for "2,941,686" read -- 2,941,868 --; line 42, for "expansive" read -- expensive --; line 62, for "maintanance" read -- maintenance --; column 3, line 33, for "insolube" read -- insoluble --; column 5, line 13, for "not" read -- no --; line 20, for "recover" read -- recovery --; line 31, for "relative" read -- relatively --; line 44, for "ring" read -- rings --.

Signed and sealed this 21st day of November 1967.

(SEAL)
Attest:

EDWARD M. FLETCHER, JR.
Attesting Officer

EDWARD J. BRENNER
Commissioner of Patents